US012617684B2

(12) United States Patent
Ono

(10) Patent No.: US 12,617,684 B2
(45) Date of Patent: May 5, 2026

(54) CATALYST SUPPORT, AND METHOD OF PRODUCING FIBROUS CARBON NANOSTRUCTURE

(71) Applicant: ZEON CORPORATION, Tokyo (JP)

(72) Inventor: Yusuke Ono, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 482 days.

(21) Appl. No.: 18/261,112

(22) PCT Filed: Jan. 13, 2022

(86) PCT No.: PCT/JP2022/000983
§ 371 (c)(1),
(2) Date: Jul. 12, 2023

(87) PCT Pub. No.: WO2022/163371
PCT Pub. Date: Aug. 4, 2022

(65) Prior Publication Data
US 2024/0217824 A1 Jul. 4, 2024

(30) Foreign Application Priority Data

Jan. 28, 2021 (JP) ................................. 2021-012331

(51) Int. Cl.
*C01B 32/162* (2017.01)
*B01J 21/04* (2006.01)
(Continued)

(52) U.S. Cl.
CPC ............. *C01B 32/162* (2017.08); *B01J 21/04* (2013.01); *B01J 23/745* (2013.01);
(Continued)

(58) Field of Classification Search
CPC ... C01B 32/162; C01B 2202/32; C01B 32/15; C01B 32/158; C01B 32/159;
(Continued)

(56) References Cited

U.S. PATENT DOCUMENTS

| 9,096,435 B2 | 8/2015 | Haba et al. |
| 2012/0219490 A1 | 8/2012 | Noda et al. |

(Continued)

FOREIGN PATENT DOCUMENTS

| CN | 102482098 A | 5/2012 |
| CN | 105531226 A | 4/2016 |

(Continued)

OTHER PUBLICATIONS

Nikkanen, et al., Synthesis of carbon nanotubes on FexOy doped Al2O3—ZrO2 nanopowder, Powder Technology 2014; 266: 106-112 (Year: 2014).*

(Continued)

*Primary Examiner* — Daniel C. Mccracken
(74) *Attorney, Agent, or Firm* — KENJA IP LAW PC

(57) ABSTRACT
The purpose of the present invention is to provide a catalyst support with which it is possible to produce a high-quality fibrous carbon nanostructure. The purpose of the present invention is to provide a catalyst support used when producing a fibrous carbon nanostructure, the catalyst support comprising a carrier and a catalyst layer formed on the carrier, the catalyst layer including a metal-containing compound, and the difference $\Delta YI$ in yellowness expressed by the formula being 3-20, where $YI_A$ is the yellowness of the carrier, and $YI_B$ is the yellowness of the catalyst support. $\Delta YI = YI_B - YI_A$.

7 Claims, 3 Drawing Sheets

(51) Int. Cl.

| | |
|---|---|
| *B01J 23/745* | (2006.01) |
| *B01J 37/02* | (2006.01) |
| *B01J 37/08* | (2006.01) |
| *B82Y 30/00* | (2011.01) |
| *B82Y 40/00* | (2011.01) |

(52) U.S. Cl.

CPC ........... *B01J 37/0223* (2013.01); *B01J 37/08* (2013.01); *B82Y 30/00* (2013.01); *B82Y 40/00* (2013.01); *C01B 2202/32* (2013.01); *C01P 2006/12* (2013.01)

(58) Field of Classification Search

CPC ..... C01B 32/16; C01B 32/164; C01B 32/166; C01B 32/168; C01B 32/17; C01B 32/172; C01B 32/174; C01B 32/176; C01B 32/178; C01B 2202/00; C01B 2202/02; C01B 2202/04; C01B 2202/06; C01B 2202/08; C01B 2202/10; C01B 2202/20; C01B 2202/22; C01B 2202/24; C01B 2202/26; C01B 2202/28; C01B 2202/30; C01B 2202/34; C01B 2202/36; B01J 21/04; B01J 23/745; B01J 37/0223; B01J 37/08; B01J 21/066; B01J 35/40; B01J 37/0219; B01J 37/0221; B82Y 30/00; B82Y 40/00; C01P 2006/12; D01F 9/133; D01F 9/12; D01F 9/127; D01F 9/1271; D01F 9/1272; D01F 9/1273; D01F 9/1274; D01F 9/1275; D01F 9/1276; D01F 9/1277; D01F 9/1278

See application file for complete search history.

(56) References Cited

U.S. PATENT DOCUMENTS

| | | | |
|---|---|---|---|
| 2016/0002033 A1 | 1/2016 | Noda et al. |
| 2016/0221828 A1 | 8/2016 | Shibuya |
| 2019/0055128 A1 | 2/2019 | Noda et al. |
| 2020/0009536 A1 | 1/2020 | Noda et al. |
| 2020/0016586 A1 | 1/2020 | Noda et al. |

FOREIGN PATENT DOCUMENTS

| | | |
|---|---|---|
| CN | 108698830 A | 10/2018 |
| JP | 2020157229 A | 10/2020 |
| WO | 2012057229 A1 | 5/2012 |

OTHER PUBLICATIONS

NW-12, accessed online at https://www.nippondenshoku.co.jp/web/english/products/nw12.htm on Jan. 2, 2026 (Year: 2026).*

Dupuis, et al., The catalyst in the CCVD of carbon nanotubes—a review, Progress in Materials Science 2005; 50: 929-961 (Year: 2005).*

Jul. 31, 2023, International Preliminary Report on Patentability issued in the International Patent Application No. PCT/JP2022/000983.

Riichiro Saito et al., Fundamentals and Applications of Carbon Nanotubes, 2004, pp. 33-34, Baifukan with English language concise explanation of relevance.

Sumio Iijima, Helical microtubules of graphitic carbon, nature, Nov. 7, 1991, pp. 56-58, vol. 354.

Dec. 6, 2024, the Extended European Search Report issued by the European Patent Office in the corresponding European Patent Application No. 22745596.1.

* cited by examiner

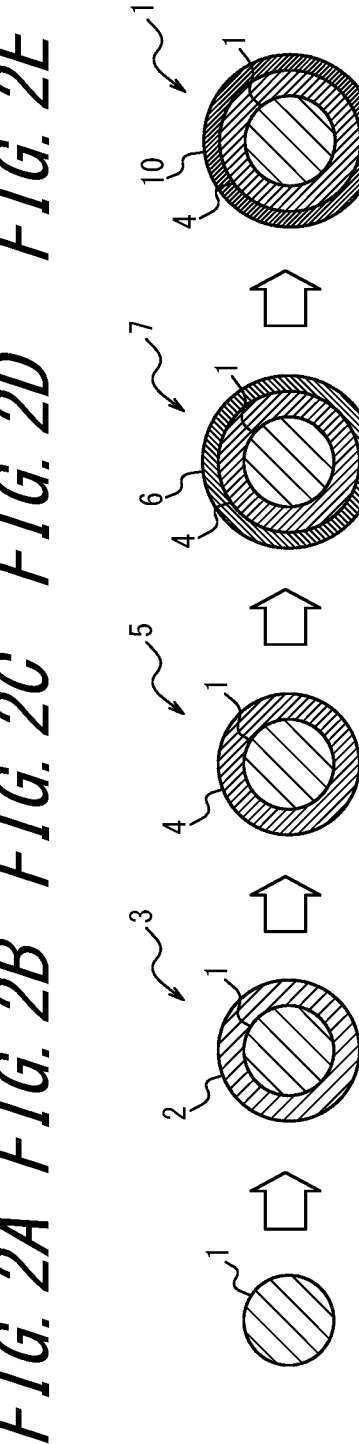

CATALYST SUPPORT, AND METHOD OF PRODUCING FIBROUS CARBON NANOSTRUCTURE

TECHNICAL FIELD

This disclosure relates to catalyst supports, and a method of producing fibrous carbon nanostructures.

BACKGROUND

Fibrous carbon nanostructures such as carbon nanotubes (hereinafter, also referred to as "CNTs", see for example, Non-patent Literature (NPL) 1) are used in a wide variety of applications as being excellent in various characteristics such as mechanical strength, sliding property, flexibility, semi- and metallic conductivity, and thermal conductivity, as well as being high in chemical stability.

In light thereof, in recent years, studies have been made on methods of producing, efficiently and at low cost, fibrous carbon nanostructures having such excellent characteristics.

Here, as the methods of producing carbon nanotubes, arc discharge methods, laser evaporation methods, chemical vapor deposition (CVD) methods, and other methods are reported. Of those methods, CVD methods are suited for large-scale synthesis, continuous synthesis, and highly pure synthesis of single-walled carbon nanotubes excellent in the aforementioned characteristics, and various studies are being made thereon (see, for example, NPL 2). CVD methods use catalyst supports obtained by supporting a catalyst component on surfaces of substrates or particles serving as carriers.

For example, Patent Literature (PTL) 1 discloses technology of synthesizing carbon nanotubes on a support on which a catalyst including Fe and other elements is supported, by flowing a source gas consisting of acetylene, carbon dioxide, and an inert gas at predetermined partial pressures over the support.

Further, PTL 2 discloses a fluidized bed method for synthesizing carbon nanotubes by using catalyst supports obtained by forming a catalyst layer on a surface of particulate carriers.

CITATION LIST

Patent Literature

PTL1: WO2012/057229A
PTL 2: JP2020-157229A

Non-Patent Literature

NPL 1: S. Iijima, Nature 354, 56 (1991).
NPL 2: "Fundamentals and Applications of Carbon Nanotubes" co-edited with Riichiro Saito and Hisanori Shinohara, pp. 33 to 34, Baifukan, 2004

SUMMARY

Technical Problem

However, fibrous carbon nanostructures produced by using the aforementioned conventional s still have room for improvement in terms of quality such as, for example, specific surface area.

Accordingly, it could be helpful to provide catalyst supports capable of producing high-quality fibrous carbon nanostructures.

It could also be helpful to provide a method of producing fibrous carbon nanostructures capable of producing high-quality fibrous carbon nanostructures.

Solution to Problem

The inventor conducted diligent investigation to achieve the objectives set forth above. Through this investigation, the inventor has found that, when catalyst supports obtained by forming a catalyst layer including a metal-containing compound on carriers have a difference in yellowness falling within a predetermine range, the difference being obtained by subtracting the yellowness of the carriers from the yellowness of the catalyst supports, high-quality fibrous carbon nanostructures can be produced using said catalyst supports, to thereby complete the disclosure.

That is, this disclosure aims to advantageously solve the problems set forth above, and the catalyst supports disclosed herein are catalyst supports for use in producing fibrous carbon nanostructures, the catalyst supports including carriers and a catalyst layer formed on the carriers, in which the catalyst layer includes a metal-containing compound, and the difference $\Delta YI$ in yellowness expressed by the formula $\Delta YI = YI_B - YI_A$ being 3 or more and 20 or less, where $YI_A$ is the yellowness of the carriers and $YI_B$ is the yellowness of the catalyst supports. In this manner, when catalyst supports obtained by forming a catalyst layer including a metal-containing compound on carriers have a difference in yellowness falling within a predetermined range, the difference being obtained by subtracting the yellowness of the carriers from the yellowness of the catalyst supports, high-quality fibrous carbon nanostructures can be produced using said catalyst supports.

The yellowness $YI_A$ of the carriers and the yellowness $YI_B$ of the catalyst supports can be measured by the method described in Examples disclosed herein. Here, in the catalyst supports disclosed herein, in a case where the surface of the carriers is covered with a catalyst supporting layer to be described later, the term "carrier" refers to a carrier in a state of being covered with the catalyst supporting layer. That is, in the catalyst supports disclosed herein, when catalyst supporting layer-attached carriers obtained by covering a surface of the carriers with the catalyst supporting layer, the "yellowness $YI_A$ of the carrier" refers to the yellowness YI obtained by measuring the catalyst supporting layer-attached carriers by the method described in Examples disclosed herein.

Further, in this disclosure, fibrous carbon nanostructures including carbon nanotubes can be regarded as having high quality as long as, for example, said fibrous carbon nanostructures including carbon nanotubes have the BET specific surface area of 600 $m^2/g$ or more. The term "BET specific surface area" herein refers to a nitrogen absorption specific surface area measured by the BET method.

Here, in the catalyst supports disclosed herein, for example, the metal-containing compound includes an iron compound such as iron oxide.

Further, in the catalyst supports disclosed herein, the surface of the carriers may be covered with a catalyst supporting layer. Then, the catalyst supporting layer includes, for example, a ceramic material such as an aluminum oxide.

Further, this disclosure aims to advantageously solve the problems set forth above, and the method of producing fibrous carbon nanostructures disclosed herein uses any type of the aforementioned catalyst supports, and thus capable of producing high-quality fibrous carbon nanostructures.

Advantageous Effect

This disclosure enables to provide catalyst supports capable of producing high-quality fibrous carbon nanostructures.

Further, this disclosure enables to provide a method of producing fibrous carbon nanostructures capable of producing high-quality fibrous carbon nanostructures.

BRIEF DESCRIPTION OF THE DRAWINGS

In the accompanying drawings:

FIG. 2A is a view for explaining a case of producing a catalyst support using a rotary drum type fluidizing apparatus used in an example of a method of producing catalyst supports disclosed herein;

FIG. 2B is a view for explaining a case of producing a catalyst support using a rotary drum type fluidizing apparatus used in an example of a method of producing catalyst supports disclosed herein;

FIG. 2C is a view for explaining a case of producing a catalyst support using a rotary drum type fluidizing apparatus used in an example of a method of producing catalyst supports disclosed herein;

FIG. 2D is a view for explaining a case of producing a catalyst support using a rotary drum type fluidizing apparatus used in an example of a method of producing catalyst supports disclosed herein; and FIG. 2E is a view for explaining a case of producing a catalyst support using a rotary drum type fluidizing apparatus used in an example of a method of producing catalyst supports disclosed herein.

DETAILED DESCRIPTION (Catalyst Supports)

Figure 1A:
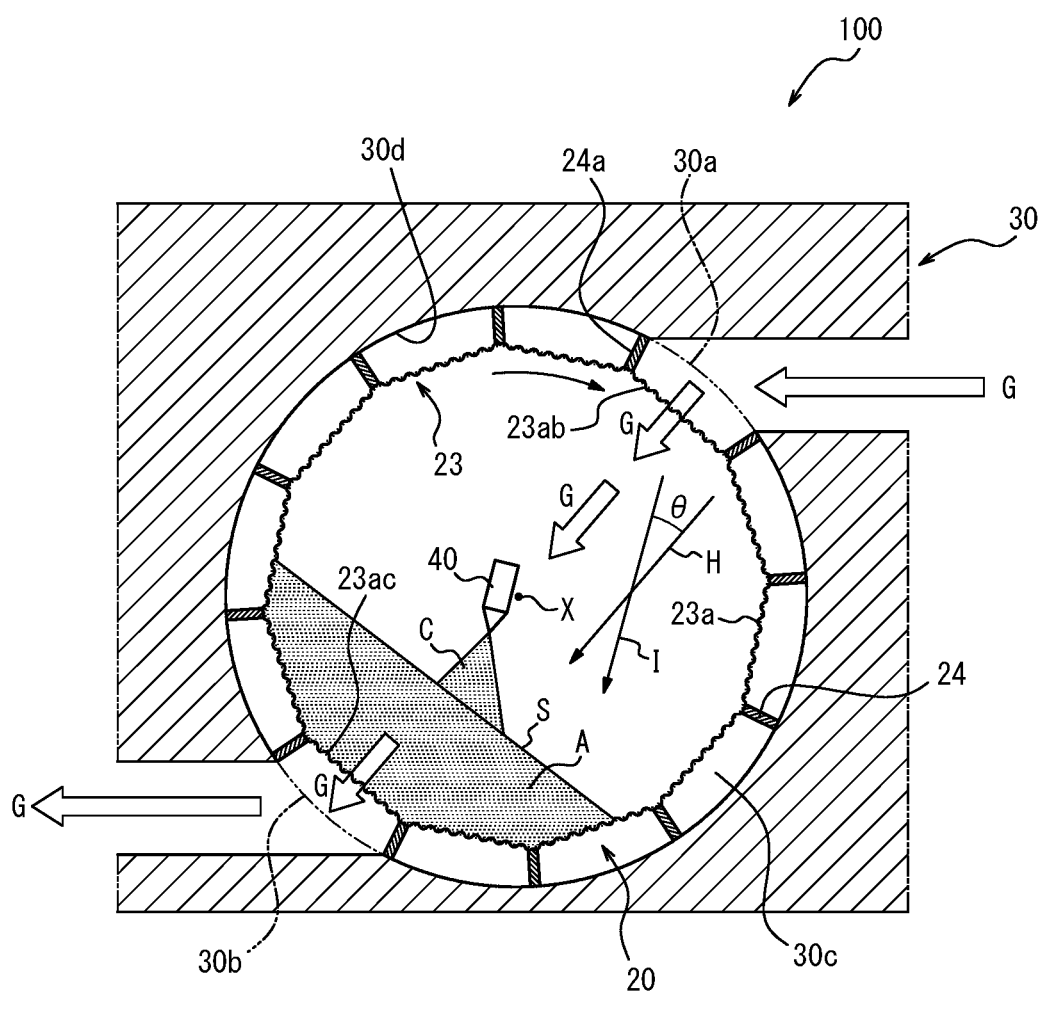
FIG. 1A is a schematic sectional view illustrating a schematic configuration of an example of a rotary drum type fluidizing apparatus used in an example of a method of producing catalyst supports disclosed herein.

The catalyst supports disclosed herein are used in producing fibrous carbon nanostructures. The catalyst supports disclosed herein include carriers and a catalyst layer formed on the carriers. Here, the catalyst layer includes a metal-containing compound. In the catalyst supports disclosed herein, the difference $\Delta YI$ in yellowness expressed by the formula $\Delta YI=YI_B-YI_A$ falls within a predetermined range, where $YI_A$ is the yellowness of the carriers and $YI_B$ is the yellowness of the catalyst supports.

The use of the catalyst supports disclosed herein in producing fibrous carbon nanostructures allows for producing high-quality fibrous carbon nanostructures.

<Carriers>

The carriers are made of any material, and serve as a portion constituting a matrix structure for forming and supporting a catalyst layer on the carriers.

The carriers may be, for example, particulate in shape, without being particularly limited thereto. In general, when particulate carriers are used, catalyst supports to be produced by using the particulate carriers will also be particulate in shape.

Here, the term "particulate" refers to being substantially particulate in shape, with an aspect ratio being preferably 10 or less. The particulate carriers having an aspect ratio of 10 or less allows a catalyst solution to be uniformly sprayed in a method of producing catalyst supports to be described later.

In the present disclosure, the "aspect ratio of the particulate carriers" can be determined by measuring, with a transmission electron microscope, the minor diameter and major diameter of randomly selected 100 particulate carriers.

The material of the carriers is not particularly limited and may preferably include a metal oxide, more preferably include a metal oxide containing at least one element selected from the group consisting of magnesium (Mg), aluminum (Al), silicon (Si), zirconium (Zr), and molybdenum (Mo), and further preferably include a metal oxide such as zirconium dioxide (zirconia), aluminum oxide, and zircon. The particulate carriers formed of a metal oxide can be improved in heat resistance. Further, using zirconium dioxide (zirconia), aluminum oxide, or zircon as the metal oxide can further improve the heat resistance.

When the carriers are particulate in shape, the particle diameter of the particulate carriers may preferably be 50 μm or more and 10 mm or less, without particularly limited. When the diameter of the particulate carriers is 50 μm or more, the particulate carriers and CNTs can easily be separated from each other after CNTs are synthesized. When the diameter is 10 mm or less, the total surface area of the particles in the same volume is increased, and thus the productivity of CNTs can be increased. The "particle diameter" of the particulate carriers means a volume-average particle diameter D50. The volume-average particle diameter D50 represents a particle diameter at 50% of volume accumulation calculated from the smaller diameter side in a particle-size distribution measured by the laser diffractometry for the particulate carriers.

Further, the carriers may be structured as carriers alone made of the aforementioned material, or as catalyst supporting layer-attached carriers obtained by covering a surface of the carriers with an arbitrary catalyst supporting layer. The catalyst supporting layer is made of any material, and may have, for example, a structure including a single layer (single-layer structure) or a structure including a plurality of layers (multilayer structure). From the viewpoint of favorably supporting the catalyst on the carriers to thereby effectively utilize the catalyst supports, catalyst supporting layer-attached carriers are preferred as the carriers.

The composition of the catalyst supporting layer is not particularly limited, and may be selected as appropriate according to the type of the carriers and the type of the catalyst to be described later. The catalyst supporting layer may be formed of, for example, a ceramic material such as alumina (aluminum oxide), titania, titanium nitride, silicon oxide, and the like. The film thickness of the catalyst supporting layer to be formed may also be adjusted as appropriate according to a desired amount of catalyst to be supported. The catalyst supporting layer may be formed on a surface of the carriers, for example, in an example of the method of producing catalyst supports of the present disclosure to be described later, by using a solution for forming the ceramic material in place of the catalyst solution and performing a spraying step, a drying step, and a baking step.

<Catalyst Layer>

The catalyst layer includes a metal-containing compound as a catalyst component and is formed on the aforementioned carriers. The catalyst layer may be directly supported on a surface of the carriers to constitute catalyst supports, or may be indirectly supported on a surface of the carriers via the catalyst supporting layer or the like to constitute catalyst supports (for example, when particulate carriers are used, the particulate carrier/catalyst supporting layer/catalyst layer may be formed in this order from inside).

In general, the catalyst layer is present on the outermost surface of the catalyst supports and serves to promote synthesis of fibrous carbon nanostructures.

The metal contained in the metal-containing compound may be any metal as long as being able to function as a catalyst for synthesizing fibrous carbon nanostructures such as CNTs. Examples thereof include iron (Fe), molybdenum (Mo), and cobalt (Co).

As the metal-containing compound, for example, an iron compound such as iron oxide, iron acetate, iron nitrate, iron chloride, ferrocene, and acetylacetonate iron; a cobalt compound such as cobalt acetate; and the like may be used.

<Difference ΔYI in Yellowness>

In the catalyst supports disclosed herein, the difference ΔYI in yellowness expressed by the formula $\Delta YI = YI_B - YI_A$ needs to be 3 or more, preferably 4.5 or more, more preferably 5.5 or more, further preferably 6.5 or more, needs to be 20 or less, preferably 18 or less, more preferably 15 or less, and further preferably 12 or less, where the yellowness of the carriers is $YI_A$ and the yellowness of the catalyst supports is $YI_B$.

The catalyst supports having the difference ΔYI in yellowness falling within the aforementioned predetermined range enable to produce high-quality fibrous carbon nanostructures.

The yellowness $YI_A$ of the carriers may be adjusted by changing the material of the carriers, the composition of the catalyst-supporting layer covering the surface of the carriers, the forming method thereof, and the like.

Further, the yellowness $YI_B$ of the catalyst supports may be adjusted by changing the catalyst components of the catalyst layer and the method of forming the catalyst layer (for example, the spraying conditions of the catalyst solutions in an example of the method of producing catalyst supports to be described later).

<Method of Producing Catalyst Supports>

The catalyst supports disclosed herein may be produced by any method as long as the aforementioned difference ΔYI in yellowness between the carriers and the catalyst supports falls within a predetermined range, and may be produced by forming a catalyst layer on carriers by a known method.

As the method of forming a catalyst layer on carriers, for example, either of a dry method and a wet method may be used. In the dry method, a source gas of the catalyst is blown onto a surface of the carriers. In the wet method, a catalyst solution is applied onto a surface of the carriers.

Further, as the wet method, a method of immersing carriers in a catalyst solution (immersion method) may be used. Alternatively, in a case of using, for example, carriers in particulate shape (particulate carriers), a method of spraying a catalyst solution onto the particulate carriers while fluidizing the particulate carriers may be used. In the case of spraying the catalyst solution onto the particulate carriers while fluidizing the particulate carriers, the particulate carriers may be suspended. That is, the catalyst solution may be sprayed onto the particulate carriers while said particulate carriers are suspended and fluidized.

Hereinafter, as an example of the method of producing catalyst supports disclosed herein, a method of using a rotary drum type fluidizing apparatus will be described. However, the method of producing catalyst supports disclosed herein is not limited thereto, and an apparatus other than the rotary drum type fluidizing apparatus (for example, a centrifugal floating fluidizing apparatus or the like) may also be used. In addition, the following example uses particulate carriers, but the method of producing catalyst supports disclosed herein is not limited thereto, and carriers in any shape other than particulate may also be used.

An example of a method of producing catalyst supports disclosed herein uses a rotary drum type fluidizing apparatus to form a catalyst layer is formed on particulate carriers.

Figure 1B:
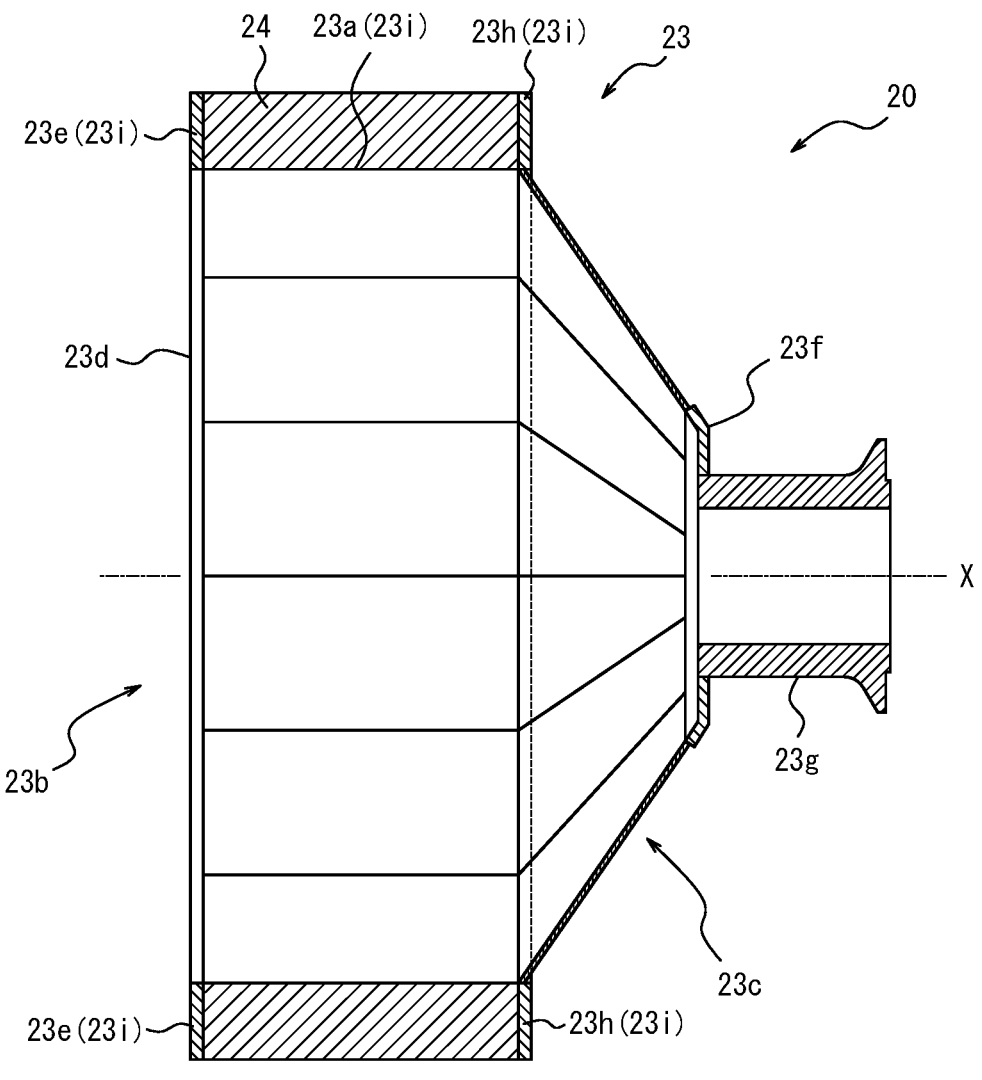
FIG. 1B is a central axial sectional view illustrating a schematic configuration of a rotary drum in the rotary drum type fluidizing apparatus of FIG. 1A.

FIG. 1A is a schematic sectional view illustrating a schematic configuration of a rotary drum type fluidizing apparatus that can be used in the method of producing catalyst supports disclosed herein, in a direction perpendicular to the central axis direction. FIG. 1B is a central axial sectional view illustrating a schematic configuration of a rotary drum in the rotary drum type fluidizing apparatus of FIG. 1A.

As illustrated in FIGS. 1A and 1B, the rotary drum type fluidizing apparatus 100 includes a casing 30, a rotary drum 20 rotatably accommodated in the casing 30 around a central axis X in a substantially horizontal direction, a rotary drive mechanism 23g for rotationally driving the rotary drum 20 around the central axis X, a spray apparatus 40 as a sprayer for spraying a catalyst solution C onto particulate carriers A accommodated in the rotary drum 20, and a drying gas supplying apparatus (not illustrated) for supplying the drying gas G to the casing 30. Here, the term "substantially horizontal direction" as used herein means that the smaller angle formed by the horizontal direction and the central axis X is 0° or more and 20° or less. In this embodiment, for the rotary drum 20, the front side thereof is on the left side (the front end opening 23d side) in FIG. 1B, and the rear side thereof is on the right side (the rotary drive mechanism 23g side) in FIG. 1B.

Formed in the casing 30 are: a supply port 30a for supplying a drying gas G to the inside of the casing 30; and an exhaust port 30b for discharging the drying gas G supplied to the inside of the casing 30, from the inside of the casing 30. Further, a gap portion 30c is provided between the casing 30 and the rotary drum 20, and a partition plate 24 to be described later is configured to be movable within the gap portion 30c. Here, the supply port 30a and the exhaust port 30b are provided at positions opposed to each other with respect to the central axis X of the rotary drum 20.

Further, as illustrated in FIG. 1A, the drying gas G in the rotary drum 20 is configured to flow along the inflow direction H. Here, the catalyst solution C is sprayed in a disposing direction I in which the spray apparatus 40 is disposed, the disposing direction I forming an angle θ of 0° or more and 45° or less with respect to the inflow direction H of the drying gas G in the rotary drum 20.

The rotary drum 20 includes a drum body 23 and a plurality of the partition plates 24.

As illustrated in FIG. 1B, the drum body 23 includes a cylindrical drum portion 23i and a tapered portion 23c provided on the rear side of the drum portion 23i and formed so as to decrease in diameter toward the rear side.

The drum portion 23i includes a circumferential wall portion 23a in a cylinder shape having a polygonal cross section (dodecagonal in this embodiment), a front end ring portion 23e in a ring shape disposed on the front side of the circumferential wall portion 23a, and a rear end ring portion 23h that is in the same shape as the front end ring portion 23e and disposed on the rear side of the circumferential wall portion 23a.

The front end ring portion 23e is formed with a front end opening 23d in a circular shape. Through this front end opening 23d, the particulate carriers A can be supplied into the rotary drum 20 and the particulate carriers A or the produced catalyst supports can be discharged from the rotary drum 20.

The tapered portion 23c is formed hollow inside thereof and communicates with the interior space of the drum portion 23i, and is configured to be capable of accommodating the particulate carriers A charged through the front end opening 23d. The rotary drive mechanism 23g for rotationally driving the rotary drum 20 is connected to the rear side of the tapered portion 23c via a connecting portion 23f.

The circumferential wall portion 23a has a ventilation portion formed therein, the ventilation portion communicating the interior space of the rotary drum 20 with the gap portion 30c disposed outside the rotary drum 20. The ventilation portion may be formed, for example, like a mesh having a plurality of pores formed therein, the pores having dimensions for allowing the drying gas to pass therethrough without allowing the particulate carriers to pass therethrough.

The plurality of the partition plates 24 are arranged at predetermined intervals along the outer circumference of the circumferential wall portion 23a, between the front end ring portion 23e and the rear end ring portion 23h on the outer circumference of the circumferential wall portion 23a. The partition plates 24 each have substantially the same dimension as the dimension of the circumferential wall portion 23a in the central axis X direction, and are disposed on the outer circumference of the circumferential wall portion 23a in a direction parallel to the central axis X of the rotary drum 20. Further, the partition plates 24 are each disposed so as to radially stand toward the outer circumference from the respective apexes of the polygons (dodecagon in FIG. 1A) of the circumferential wall portion 23a. The partition plates 24 each slide along the inner surface 30d of the casing 30 when the rotary drum 20 rotates. Formed on the outer circumference of the circumferential wall portion 23a are the front end ring portion 23e, and a plurality of communication spaces partitioned by the front end ring portion 23e and the plurality of the partition plates 24 provided at the apexes of the polygonal shape. The communication spaces each have an open configuration in the outer direction thereof (on the side facing the circumferential wall portion 23a). Therefore, the number of the plurality of communication spaces formed on the outer circumference of the circumferential wall portion 23a will correspond to the number of the sides of the polygon. In this example, the circumferential wall portion 23a is dodecagon in section, and thus twelve of the aforementioned communication spaces are formed. The opening of each communication space is formed to be substantially dimensioned to the size of the supply port 30a formed in the casing 30. The drying gas G supplied from the supply port 30a is supplied to each communication space while being prevented by the partition plates 24 from flowing out to the gap portion 30c, so that the drying gas G can be reliably supplied into the rotary drum 20. Further, the opening of each communication space is also formed to be substantially dimensioned to the size of the exhaust port 30b formed in the casing 30. Thus, the drying gas G in the rotary drum 20 passes through the respective communication spaces to be reliably discharged to the outside of the casing 30 through the exhaust port 30b.

Further, in the drying step to be described later, in the circumferential wall portion 23a, the ventilation portion at a position opposed to the supply port 30a functions as an inlet port 23ab for allowing the drying gas G to flow into the inside of the rotary drum 20, and the ventilation portion at a position opposed to the exhaust port 30b functions as a discharge port 23ac for allowing the drying gas G to be discharged from the inside of the rotary drum 20. In other words, in one example, the ventilation portion formed like a mesh in the circumferential wall portion 23a forms the inlet port 23ab at a timing when the ventilation portion is moved to a position corresponding to the supply port 30a along with the rotation of the rotary drum 20 during the drying step, and forms the discharge port 23ac at a timing when the ventilation portion is moved to a position corresponding to the exhaust port 30b.

The inlet port 23ab is positioned above a surface S of the layer of the particulate carriers A (particulate carrier layer) during the rotation of the rotary drum 20 in the gravitational direction (vertical direction) relative to the spray apparatus 40, and the discharge port 23ac is positioned below the surface S of the layer of the particulate carriers A (particulate carrier layer) during the rotation of the rotary drum 20 in the gravitational direction (vertical direction) relative to the spray apparatus 40.

Here, a length La (not illustrated) of the perpendicular line from the inlet port 23ab to the surface S of the layer of the particulate carriers A (particulate carrier layer) during the rotation of the rotary drum 20 and the length Lb (not illustrated) of the perpendicular line from the discharge port 23ac to the surface S of the layer of the particulate carriers A (particulate carrier layer) during the rotation of the rotary drum 20 preferably satisfy the relation of La>Lb, for example, as illustrated in FIG. 1A.

Hereinafter, the operation of the rotary drum type fluidizing apparatus 100 will be described.

First, the particulate carriers A are charged into the rotary drum 20 from the front end opening 23d provided on a front end 23b of the rotary drum 20. Next, the rotary drum 20 charged with the particulate carriers A is rotated by the operation of the rotary drive mechanism 23g about the central axis X. Along with the rotation of the rotary drum 20, the particulate carriers A accommodated in the rotary drum 20 are wound up upward in the gravitational direction (vertical direction), and thereafter flow downward in the gravitational direction (vertical direction) due to the gravitational effect of their own weight, so that the particulate carriers A can be efficiently caused to flow in the gravitational direction (vertical direction), and thus the particulate carriers A can be stirred efficiently.

Next, the catalyst solution C is sprayed from the spray apparatus 40 onto the particulate carriers A flowing in the rotary drum 20, and the drying gas G is passed through the supply port 30a, the inlet port 23ab, the particulate carriers A accommodated in the rotary drum 20, the discharge port 23ac, and the exhaust port 30b in this order to thereby dry the surfaces of the particulate carriers A on which the catalyst solution C is adhered, to thereby obtain the particulate carriers A each having a catalyst coating films formed thereon.

Here, the drying gas G supplied from the drying gas supply apparatus to the casing 30 and has reached the supply port 30a collides with the partition plate 24a (FIG. 1A) which is moved in a direction substantially opposite to the inflow direction of the drying gas G by the rotation of the rotary drum 20. As a result, the drying gas G is prevented from passing through the gap portion 30c of the casing 30 without flowing into the rotary drum 20, and substantially the entire amount of the drying gas G supplied through the supply port 30a can flow into the rotary drum 20.

Further, the exhaust port 30b has an opening area designed to be smaller than the area of the surface S of the layer formed by the particulate carriers A in the rotary drum 20. Accordingly, the drying gas G is effectively prevented from passing through the gap portion 30c without contacting the particulate carriers A. In this manner, substantially the entire amount of the drying gas G supplied to the supply port 30a can pass through the supply port 30a, the inlet port 23ab, the particulate carriers A accommodated in the rotary drum 20, the discharge port 23ac, and the exhaust port 30b in this order.

The rotational speed of the rotary drum 20 in the rotary drum type fluidizing apparatus 100 used in the method of producing catalyst supports disclosed herein is preferably 1 rpm or more, more preferably 3 rpm or more, particularly preferably 5 rpm or more, and preferably 100 rpm or less, more preferably 50 rpm or less, and particularly preferably 30 rpm or less, though the setting may vary depending on the difference in apparatus diameter.

With the rotational speed of the rotary drum 20 is 1 rpm or more, a satisfactory stirring effect can be obtained. With the rotational speed of 100 rpm or less, the particulate carriers A can be prevented from being in close contact with the inner wall surface of the circumferential wall portion 23a of the rotary drum 20 due to the centrifugal force.

In the rotary drum 20 of the rotary drum type fluidizing apparatus 100 used in an example of the method of producing catalyst supports disclosed herein, when the spray apparatus 40 as a sprayer is provided with a constant flow pump, the catalyst solution C can be quantitatively fed, and thus the flow rate can be easily controlled. Further, when the spray apparatus 40 as a sprayer includes an automatic spraying gun, fine and uniform mist can be spray-coated, to thereby perform exquisite coating with a small particle aggregation rate and uniform particle size. The spray apparatus 40 as a sprayer is not particularly limited, and may be, for example, a two-fluid nozzle or may include a mist generator such as an ultrasonic atomizer.

Hereinafter, steps of an example of the method of producing catalyst supports disclosed herein will be described.

An example of the method of producing catalyst supports disclosed herein includes a step of stirring the particulate carriers A by rotating, around the central axis X, the substantially cylindrical rotary drum 20 in which the particulate carriers A are accommodated (stirring step), a step of spraying the catalyst solution C onto the particulate carriers A in the rotary drum 20] (spraying step), and a step of flowing the drying gas G from outside the rotary drum 20 into the inside of the rotary drum 20 and bringing the drying gas G into contact with the particulate carriers A to which the catalyst solution C has been sprayed in the spraying step (drying step). Optionally, the method may further include, after the drying step, a step of baking the particulate carriers A at 50° ° C. or higher and 900° C. or lower (baking step). Here, in this example, at least a part of a period during which the stirring step is performed overlaps with at least a part of a period during which the spraying step is performed.

<<Stirring Step>>

In the stirring step, the rotary drum 20 accommodating the particulate carriers A therein is rotated around the central axis X.

By rotating the rotary drum 20 around the central axis X as described above, the particulate carriers A accommodated in the rotary drum 20 are wound up upward in the gravity direction (vertical direction) along with the rotation of the rotary drum 20, and then flow downward in the gravity direction (vertical direction) due to the gravity action of their own weight, so that the particulate carriers A can be stirred efficiently.

The temperature at the stirring is not particularly limited, and may be selected as appropriate according to the type of the particulate carriers A, the composition of the catalyst solution C to be described later, and the like.

<<Spraying Step>>

In the spraying step, the catalyst solution C is sprayed onto the particulate carriers A in the rotary drum 40. As described above, in this example, at least a part of a period during which the stirring step is performed overlaps with at least a part of a period during which the spraying step is performed. Thus, the spraying step includes a period during which the catalyst solution C is sprayed onto the particulate carriers A being stirred. As a result, a coating film formed by the catalyst solution C can be uniformly formed on the surfaces of the particulate carriers A.

The method of spraying the catalyst solution C onto the particulate carriers A is not particularly limited, and for example, a method of spraying the catalyst solution C from the spray apparatus 40 (spraying means) such as a spray gun or a spray nozzle is suitably used.

The conditions for spraying the catalyst solution C onto the particulate carriers A are not particularly limited as long as the desired effect of the present disclosure can be obtained, and the spraying amount, the size of the particles (mist) to be sprayed, the spraying time, and the like may be selected as appropriate.

When two or more kinds of catalyst solutions C are to be sprayed, the two or more kinds of catalyst solutions C may be sprayed as a mixed liquid from one spray apparatus 40 (spraying means), or may be separately sprayed using different spray apparatuses 40 (spraying means), with different spray apparatuses 40 (spraying means) being preferably used for the spraying.

[Catalyst Solution]

As the catalyst component contained in the catalyst solution C, a compound containing a metal (for example, nickel (Ni), iron (Fe), cobalt (Co), molybdenum (Mo), and the like) described above in the section of "Catalyst Supports" can be used.

Specific examples of the catalyst component contained in the catalyst solution C include iron compounds such as iron acetate, iron nitrate, iron chloride, ferrocene, and acetylacetonate iron; and metal-containing compounds such as cobalt acetate.

As the solvent contained in the catalyst solution C, various organic solvents such as alcohols, glycols, ketones, ethers, esters, and hydrocarbons can be used, with alcohols being preferably used. Any one of the organic solvents listed above may be used alone or a mixture of any two or more of the organic solvents listed above may be used. As the alcohol, methanol, ethanol, isopropyl alcohol, and the like are preferable from the viewpoint of ease of handling and storage stability. The catalyst solution C may contain water. The catalyst solution C may contain both or only one of a solvent and water.

In the catalyst solution C, the catalyst component is preferably dissolved in water and/or a solvent.

The solid content concentration of the catalyst solution C is not particularly limited, but is preferably 20% by mass or less, and more preferably 10% by mass or less. With the solid content concentration of the catalyst solution C being 20 mass % or less, the coating film is stabilized, and catalyst supports in which a catalyst layer is uniformly formed on the surface of the particulate carriers are obtained, to thereby synthesize fibrous carbon nanostructures such as carbon nanotubes with high efficiency, so as to provide excellent mass productivity.

<<Drying Step>>

In the drying step, the particulate carriers A sprayed with the catalyst solution C is dried, whereby a uniform catalyst coating film can be formed on the surfaces of the particulate carriers A. Specifically, as described above, the drying gas G is introduced into the rotary drum 20 from outside the rotary drum 20, and the drying gas G is brought into contact with the particulate carriers A sprayed with the catalyst solution C in the spraying step, whereby the catalyst solution C adhered to the surface of the particulate carriers A is dried to form a catalyst coating film. The particulate carriers A on which the catalyst coating film is formed can be directly used as catalyst supports, but the particulate carriers A on which the catalyst coating film is formed may be subjected to a baking step to be described later after the drying step, as necessary, depending on the composition of the catalyst solution C. Here, the catalyst coating forms a catalyst layer.

The drying gas G used in the drying step is not particularly limited, and examples thereof include compressed air and nitrogen. As used herein, the term "drying gas" refers to a gas used in an application of drying particulate carriers to which a catalyst solution has been sprayed. Thus, the "drying gas" may itself have any attribute. For example, the dew point or the like of the "drying gas" is not particularly limited.

The feed rate of the drying gas is not particularly limited, but when the amount of brim of the rotary drum (the volume of particulate carriers that can be charged) is less than 10 L, the feed rate of the drying gas is preferably 0.1 m$^3$ per minute or more, more preferably 0.3 m$^3$ per minute or more, and preferably 1 m$^3$ per minute or less. When the feed rate of the drying gas is 0.1 m$^3$ per minute or more, a sufficiently dry effect can be obtained. When the feed rate of the drying gas is 1 m$^3$ per minute or less, scattering of the particulate carriers A by the drying gas G can be suppressed, and drying of the sprayed liquid droplets prior to adhesion to the particulate carriers A can be suppressed.

When the amount of a brim of the rotary drum is 10 L or more, the feed rate is preferably 1 m$^3$ per minute or more, more preferably 3 m$^3$ per minute or more, and preferably 50 m$^3$ per minute or less. When the feed rate of the drying gas is 1 m$^3$ per minute or more, a sufficiently dry effect can be obtained, and when the feed rate of the drying gas is 50 m$^3$ per minute or less, scattering of the particulate carriers A by the drying gas G can be suppressed, and drying of the spray droplets prior to being adhered to the particulate carriers A can be suppressed.

<Baking Step>

In the baking step, the particulate carriers A that have undergone the drying step may be baked at 50° C. or higher and 900° C. or lower.

Further, the baking may be performed using a muffle furnace, a fluidized bed, or a rotary kiln, after taking out, from the rotary drum 20, the particulate carriers A having the catalyst coating film formed on the surface thereof, or may be performed in the rotary drum 20 without taking out the particulate carriers A from the rotary drum 20. The baking is preferably performed in an oxygen atmosphere. The baking temperature is preferably greater than about 200° C. The baking time is preferably from 5 minutes to 60 minutes, and more preferably from 5 minutes to 40 minutes. For example, a coating film containing an iron compound as a catalyst component needs to be baked at 80° C. or higher, preferably at 130° C. or higher, more preferably at 180° C. or higher, and generally at 300° C. or lower, preferably at 220° C. or lower. In a case in which a catalyst supporting layer is formed instead of the catalyst layer, for example, a coating film containing aluminum needs to be baked at 300° C. or higher, preferably at 340° C. or higher, more preferably at 390° C. or higher, and generally at 600° C. or lower, and preferably at 540° C. or lower.

Further, in an example of the method of producing catalyst supports disclosed herein, at least a part of the period during which the stirring step is performed, at least a part of the period during which the spraying step is performed, and at least a part of the period during which the drying step is performed overlap with one another. This way improves throughput, to thereby efficiently obtain catalyst supports in which a catalyst layer is uniformly formed on particulate carriers. Each step may be started at any timing: the spraying step and the drying step may be started simultaneously or sequentially after the stirring step is started; the three steps may be started simultaneously; or the stirring step and the drying step may be started simultaneously or sequentially after the spraying step is started in advance. Similarly, each step may be ended at any timing: for example, the stirring step and the drying step may be ended simultaneously or sequentially after the spraying step is ended prior to the other steps, or all of the steps may be ended simultaneously.

Further, in an example of the method of producing catalyst supports disclosed herein, the droplets of the catalyst solution C sprayed from the spray apparatus 40 (spraying means) adhere to the particulate carriers A to be subjected to the spraying before drying (the solvent in the droplets volatilizes), and thereafter the adhered catalyst solution C dries (the solvent in the adhered catalyst solution C volatilizes) to form a coating film, so that the catalyst layer can be uniformly formed on the surface of the particulate carriers A. Here, the drying rate of the catalyst solution C may be adjusted, for example, by adjusting (i) the volatility of the solvent in the catalyst solution C, (ii) the size of the droplet, (iii) the injection rate of the catalyst solution C, (iv) the feed rate of the drying gas G, and (v) the temperature of the drying gas G.

A specific examples of a procedure for producing catalyst supports using an example of the method of producing catalyst supports disclosed herein is illustrated below. Note that the method of producing catalyst supports disclosed herein is not limited to the following specific example, and for example, the catalyst supporting layer may not be formed, the baking may not be performed, or a catalyst layer other than the iron oxide layer may be formed.

FIGS. 2A to 2E are views for explaining a case of producing a catalyst support having a configuration (three-layer configuration) of a particulate carrier/catalyst supporting layer (aluminum oxide layer)/catalyst layer (iron oxide layer) using a rotary drum type fluidizing apparatus used in an example of the method of producing catalyst supports disclosed herein.

First, a particulate carrier 1 is prepared (FIG. 2A). Next, the prepared particulate carrier 1 (the particulate carriers A) is charged into the rotary drum 20 via the front end opening 23d and stirred (stirring step), and in order to form the catalyst supporting layer, the aluminum-containing solution is sprayed (spraying step) using the spray apparatus 40 and dried using the drying gas G flown into the rotary drum 20 via the supply port 30a and the inlet port 23ab (drying step), whereby an aluminum-containing coating film 2 is formed, and a coating film-covered particulate carrier 3 having the coating film 2 formed on the surface thereof is produced (FIG. 2B). Next, the coating film-covered particulate carrier 3 having the coating film 2 formed on the surface thereof is baked (baking step), to thereby fabricate a catalyst supporting layer-attached particulate carrier 5 having a catalyst supporting layer 4 made of an aluminum oxide layer formed on the surface of the particulate carrier 1 (FIG. 2C). Next, the catalyst supporting layer-attached particulate carrier 5 is charged into the rotary drum 20 via the front end opening 23*d* and stirred (stirring step), and the iron compound-containing solution as the catalyst solution C is sprayed (spraying step) using the spray apparatus 40 and dried using the drying gas G flown into the rotary drum 20 via the supply port 30*a* and the inlet port 23*ab* (drying step), whereby obtaining a catalyst coating film-covered particulate carrier 7 having an iron compound-containing coating film 6 formed on the surface (FIG. 2D). Finally, the catalyst coating film-covered particulate carrier 7 is baked (baking step) to obtain a catalyst support 11 in which the iron oxide layer 10 (catalyst layer) is formed on a surface of the catalyst supporting layer-attached particulate carrier 5 (FIG. 2E).

In this example, the central axis X is configured to extend in a substantially horizontal direction, but without being limited to this configuration, for example, a central axis Y corresponding to the central axis X may be configured to be inclined from the horizontal direction, without the inclination angle thereof being particularly limited.

Further, the drying gas G is supplied into the rotary drum 20 and discharged from the circumferential wall portion 23*a* corresponding to the outer circumference of the rotary drum 20, but the supply position and the discharge position of the drying gas G are not particularly limited.

(Method of Producing Fibrous Carbon nanostructures)

The method of producing fibrous carbon nanostructures disclosed herein is a method of producing fibrous carbon nanostructures. The method of producing fibrous carbon nanostructures disclosed herein includes a step of supplying a source gas to the catalyst supports obtained by the method of producing catalyst supports disclosed herein and synthesizing fibrous carbon nanostructures on a catalyst layer (synthesis step).

<Fibrous Carbon Nanostructures>

The fibrous carbon nanostructures are not particularly limited, and examples thereof include fibrous carbon nanostructures having an aspect ratio of more than 10. Specifically, the fibrous carbon nanostructures may include CNTs, vapor-grown carbon fibers, and the like.

In this disclosure, "the aspect ratio of fibrous carbon nanostructures" can be determined by measuring, with a transmission electron microscope, the diameters (external diameters) and lengths of 100 randomly selected fibrous carbon nanostructures.

Hereinafter, the fibrous carbon nanostructures obtained by the production method disclosed herein include CNTs, but the present disclosure is not limited thereto.

<<Carbon Nanotubes>>

CNTs each have a structure in which a graphene sheet is wound in a cylindrical shape, and has a one-dimensional structure with a very large aspect ratio (see NPL 1). Here, the fibrous carbon nanostructures including CNTs may be composed of CNTs alone, or may be a mixture of CNTs and fibrous carbon nanostructures other than CNTs.

Further, CNTs are not particularly limited, and may be single-walled carbon nanotubes and/or multi-walled carbon nanotubes. From the viewpoint of enhancing properties such as various mechanical strength, electric properties, and thermal conductivity, CNTs are preferably composed of 10 or less layers, more preferably 5 or less layers, and further preferably single-walled carbon nanotubes. The single-walled carbon nanotubes/multi-walled carbon nanotubes can be adjusted as appropriate by changing various reaction conditions such as, for example, the size of the catalyst, the composition of the catalyst, the reaction time, and the feed rate of the source gas.

[Properties]

In addition, the fibrous carbon nanostructures including CNTs may have a desired average diameter depending on various applications. For example, in general, when the particle diameter of the fine metal particles as the catalyst generated by the reduction of the catalyst layer described above is about 1 nm or more and 2 nm or less, the average diameter of CNTs or the like can be adjusted to about 1 nm. When the particle diameter of the fine metal particles is about 30 nm, the average diameter of CNTs or the like can be adjusted to about 20 nm or more and 30 nm or less. Generally, the various properties are improved as the average diameter of CNTs is finer.

The "average diameter" of the fibrous carbon nanostructures including CNTs can be determined by measuring, for example, with a transmission electron microscope, the diameters (outer diameters) of 100 of fibrous carbon nanostructures randomly selected.

The average length of the fibrous carbon nanostructures including CNTs can be set to a desired value depending on various applications, but the average length when synthesized is preferably 1 µm or more, and more preferably 50 µm or more. When the average length of the fibrous carbon nanostructures including CNTs as synthesized is 1 µm or more, the fibrous carbon nanostructures to be obtained can more favorably exhibit various mechanical strengths, electric properties, thermal conductivity, and other properties. Further, as the length of the fibrous carbon nanostructures including CNTs as synthesized is longer, the fibrous carbon nanostructures are more likely to be susceptible to damages such as breakage and cutting, and therefore, the average length of the fibrous carbon nanostructures including CNTs at the time of synthesis is preferably set to 5000 µm or less.

The "average length" of the fibrous carbon nanostructures including CNTs can be adjusted as appropriate, for example, by changing the synthesis reaction time.

The method of producing fibrous carbon nanostructures disclosed herein uses the aforementioned catalyst supports disclosed herein, and thus the fibrous carbon nanostructures to be produced have a large specific surface area and high quality.

Specifically, when the fibrous carbon nanostructures to be produced include CNTs, the BET specific surface area of the fibrous carbon nanostructures including CNTs is preferably 600 m$^2$/g or more, more preferably 700 m$^2$/g or more, and further preferably equal to or greater than 800 m$^2$/g. With the BET specific surface area of 600 m$^2$/g or more, the fibrous carbon nanostructures including CNTs are of sufficiently high quality.

The BET specific surface area of the fibrous carbon nanostructures including CNTs is not particularly limited, but may be, for example, 2000 m$^2$/g or less, 1800 m$^2$/g or less, or 1600 m$^2$/g or less.

<Synthesis Step>

In the method of producing fibrous carbon nanostructures disclosed herein, a source gas is supplied to the catalyst supports obtained by the method of producing catalyst supports disclosed herein, and the fibrous carbon nanostructures are synthesized on the catalyst layer. For example, a source gas is supplied to the catalyst layer as the outermost layer of the catalyst supports obtained by the method of producing catalyst supports disclosed herein to generate fibrous carbon nanostructures on the catalyst layer, and the produced fibrous carbon nanostructures are grown by a chemical vapor deposition method, to thereby synthesize and grow fibrous carbon nanostructures such as carbon nanotubes with high efficiency and provide excellent mass productivity. The catalyst support is usually subjected to a reduction treatment before being used in the method of producing fibrous carbon nanostructures.

In the synthesis step, generally, at least one of the catalyst layer and the source gas is heated. From the viewpoint of growing the fibrous carbon nanostructures at a uniform density, at least the source gas is preferably heated. The heating temperature is preferably 400° C. or higher and 1100° C. or lower. In the synthesis step, a source gas, optionally an inactive gas, a reducing gas, and/or a catalyst activating material are introduced into a fibrous carbon nanostructure growth furnace accommodating catalyst supports.

From the viewpoint of enhancing the production efficiency of fibrous carbon nanostructures, a reducing gas and a source gas may preferably be supplied through a gas shower to the catalyst in the catalyst layer.

—Source Gas—

As the source gas, a carbon source-containing material that is a gas at a temperature at which fibrous carbon nanostructures grow. In particular, hydrocarbons such as methane, ethane, ethylene, propane, butane, pentane, hexane, heptane, propylene, and acetylene are preferable. Other examples of the source gas may include lower alcohols such as methanol and ethanol, acetone, and oxygen-containing compounds having a low carbon number such as carbon monoxide. A mixture of these gases may also be used.

—Inactive Gas—

The source gas may be diluted with an inactive gas. The inactive gas may be any gas as long as being inactive at a temperature at which fibrous carbon nanostructures grow and not reacting with the growing fibrous carbon nanostructures, with a gas that does not reduce the activity of the catalyst being preferred. Examples thereof include noble gases such as helium, argon, neon, and krypton; nitrogen; hydrogen; and a mixed gas of any of these gases.

—Reducing Gas—

As the reducing gas, for example, hydrogen gas, ammonia, water vapor, and a mixed gas of any of these gases can be used. Furthermore, the reducing gas may be a mixed gas obtained by mixing hydrogen gas with an inactive gas such as helium gas, argon gas, or nitrogen gas.

—Catalyst Activating Material—

In the synthesis step of fibrous carbon nanostructures, a catalyst activating material may be added. The addition of a catalyst activating material enables further improvement in production efficiency and purity of the fibrous carbon nanostructures. The catalyst activating material used here is generally a material containing oxygen, and is preferably a material that does not significantly damage fibrous carbon nanostructures at a temperature at which the fibrous carbon nanostructures grow. Examples of effective catalyst activating materials include water, oxygen, ozone, acidic gases, nitrogen oxide, and low-carbon number oxygen-containing compounds such as carbon monoxide and carbon dioxide; alcohols such as ethanol and methanol; ethers such as tetrahydrofuran; ketones such as acetone; aldehydes; esters; and a mixture of any of these materials. Among these examples, water, oxygen, carbon dioxide, carbon monoxide, and ethers are preferable, and water is particularly suitable.

The volume concentration of the catalyst activating material is not particularly limited, but is preferably contained by a trace amount. For example, in the case of water, the volume concentration of the catalyst activating material is usually 10 ppm or more and 10000 ppm or less, preferably 50 ppm or more and 1000 ppm or less, in a gas introduced into the furnace.

—Other Conditions—

The pressure in the reactor and the treatment time in the synthesis step may be set as appropriate in consideration of other conditions. For example, the pressure may be $1 \times 10^2$ Pa or more and $1 \times 10^7$ Pa or less, and the treatment time may be about 1 minute or more and 60 minutes or less.

EXAMPLES

Examples disclosed herein will be described below, but the present disclosure is not limited to these examples in any way.

The yellowness and the BET specific surface area were measured according to the following methods.

<Yellowness>

A compact color/whiteness meter Color meter NW-12 (manufactured by Nippon Denshoku Industries Co., Ltd.) was used to measure the yellowness YI for beads (catalyst supporting layer-attached particulate carriers or catalyst supports) as a sample filled by at least 21 g in a powder measuring cell, under the measurement conditions with a D65 light source and a 10° field of view. Then, the difference in yellowness $\Delta YI\text{-}YI_B\text{-}YI_A$ was determined, with the yellowness YI measured using the catalyst supporting layer-attached particulate carriers being the yellowness $YI_A$ of the carriers and the yellowness YI measured using the catalyst supports being the yellowness $YI_B$ of the catalyst supports.

<BET Specific Surface Area>

The BET specific surface area of carbon nanotubes was measured using a Full Automatic BET Specific Surface Area Analyzer "Macsorb® (Macsorb is a registered trademark in Japan, other countries, or both) HM model-1210" (manufactured by Mountech Co., Ltd.).

Example 1

Production of Catalyst Supports

Catalyst supports were produced in the same manner as in the embodiment of FIG. 2. Zirconia (zirconium dioxide) beads ($ZrO_2$, with the volume average particle diameter D50 of 650 μm) 3000 g as a metal oxide were charged into the rotary drum 20 of the rotary drum type fluidizing apparatus 100 illustrated in FIGS. 1A and 1B, and while the zirconia beads (particulate carriers A) being stirred (the rotary drum 20 is rotated about the central axis X being in the horizontal direction, at rotational speed of 30 rpm), an aluminum-containing solution is sprayed by a spray gun (spray apparatus 40) (with the spray amount of 3 g/minute and the spraying time of 2840 seconds), in order to form a catalyst supporting layer. While spraying the solution, compressed air as the drying gas G was supplied into the rotary drum 20 at 0.7 m³/minute and discharged from the rotary drum 20 to dry the solution, thereby having a coating film of the aluminum-containing solution formed on the zirconia beads. Next, a baking treatment was performed at 540° C. for 45 minutes to obtain catalyst supporting layer-attached particulate carriers on which an aluminum oxide layer as the catalyst supporting layer was formed. The yellowness $YI_A$ of the carriers was measured using the obtained catalyst supporting layer-attached particulate carriers.

Further, the obtained catalyst supporting layer-attached particulate carriers were charged into the rotary drum 20 of another rotary drum type fluidizing apparatus 100, and while the charged carriers being stirred (by rotating the rotary drum 20 about the central axis X being in the horizontal direction at a rotation speed of 20 rpm), an iron catalyst solution (catalyst solution C) obtained by dissolving iron acetate (II) in isopropyl alcohol (IPA) was sprayed by a spray gun (spray apparatus 40) (with the spray amount of 5 g/minute and the spraying time of 170 seconds), and compressed air as the drying gas G was supplied into the rotary drum 20 at 0.03 m³/minute and discharged from the rotary drum 20 to dry the solution, to thereby form a coating film of the iron catalyst solution (catalyst solution C) on the catalyst supporting layer-attached particulate carriers. Next, a baking treatment was performed at 220° C. for 10 minutes to obtain catalyst supports in each of which an iron oxide layer as the catalyst layer was further formed. The yellowness $YI_B$ of the catalyst supports was measured using the obtained catalyst supports, and the difference $\Delta YI(=YI_B-YI_A)$ of the yellowness was determined. The results are illustrated in Table 1.

Synthesis of Carbon Nanotubes

For the catalyst supports obtained above, a source gas containing ethylene gas ($C_2H_4$) was supplied into a reactor catalyst supports were changed as illustrated in Table 1, and the various measurements were carried out. The results are illustrated in Table 1.

Examples 6 and 7

Catalyst supports were produced and CNTs were synthesized in the same manner as in Example 1, except that, in the production of the catalyst supports, the components of the iron catalyst solution were changed as illustrated in Table 1 and the spraying times for spraying the iron catalyst solution were changed as illustrated in Table 1, and the various measurements were carried out. The results are illustrated in Table 1.

Comparative Example 1

Catalyst supporting layer-attached particulate carriers were obtained in the same manner as in Example 1, except that no operation was performed after the spraying of the iron catalyst solution in the production of catalyst supports. The same operation as in Example 1 was carried out except that, in the synthesis of CNTs, the catalyst supporting layer-attached particulate carriers obtained above were used instead of the catalyst supports, which however failed to synthesize carbon nanotubes.

TABLE 1

| | Catalyst Support | | | | CNT |
| | Catalyst Solution | | Spraying | Difference | BET |
| | Fe Raw Material | Solvent | Time [sec.] | $\Delta YI$ in Yellowness | Specific Surface Area (m²/g) |
|---|---|---|---|---|---|
| Comparative Example 1 | — | | — | — | — | — |
| Example 3 | iron acetate | IPA | 102 | 4.6 | 758 |
| Example 1 | iron acetate | IPA | 170 | 6.5 | 987 |
| Example 2 | iron acetate | IPA | 238 | 9.5 | 882 |
| Example 4 | iron acetate | IPA | 340 | 12.8 | 671 |
| Example 5 | iron acetate | IPA | 681 | 17.9 | 618 |
| Comparative Example 2 | iron acetate | IPA | 851 | 21.7 | 429 |
| Comparative Example 3 | iron acetate | IPA | 1020 | 27.0 | 419 |
| Example 6 | iron acetylacetonate | IPA | 311 | 15.3 | 800 |
| Example 7 | iron nitrate nonahydrate | IPA | 377 | 13.0 | 775 | tube at a total flow rate of 1500 sccm for 10 minutes under an environment of atmospheric pressure and a temperature of 850° C. The source gas was supplied in this manner, to thereby synthesize carbon nanotubes on the catalyst supports by a fluidized bed method in which the catalyst supports were fluidized.

Then, the BET specific surface area of the obtained carbon nanotubes was measured. The results are illustrated in Table 1.

Examples 2 to 5, Comparative Examples 2 to 3

Catalyst supports were produced and CNTs were synthesized in the same manner as in Example 1, except that, in the production of catalyst supports, the spraying times for spraying the iron catalyst solutions in the production of As understood from Table 1, with the use of the catalyst supports of Examples 1 to 7 obtained by forming a catalyst layer containing a metal-containing compound on carriers, in which the difference obtained by subtracting the yellowness of the catalyst supports from the yellowness of the carriers was within a predetermined range, high-quality carbon nanotubes having a large BET specific surface area could be produced.

On the other hand, in the case of Comparative Example 1 in which no catalyst layer containing the metal-containing compound was formed on the carriers, carbon nanotubes were failed to be produced.

In addition, when the catalyst supports of Comparative Examples 2 and 3 in which the difference obtained by subtracting the yellowness of the carriers from the yellowness of the catalyst supports was out of the predetermined range were used, the produced carbon nanotubes had a small BET specific surface area and were inferior in quality.

INDUSTRIAL APPLICABILITY

The present disclosure enables to provide catalyst supports capable of producing high-quality fibrous carbon nanostructures.

Further, the present disclosure enables to provide a method of producing fibrous carbon nanostructures capable of producing high-quality fibrous carbon nanostructures.

REFERENCE SIGNS LIST 1 particulate carrier
2 coating film
3 coating film-covered particulate carrier
4 catalyst supporting layer
5 catalyst supporting layer-attached particulate carrier
6 coating film
7 catalyst coating film-covered particulate carrier
10 iron oxide layer
11 catalyst support
20 rotary drum
23 drum body
23 circumferential wall portion
23ab inlet port
23ac discharge port
23b front end
23c tapered portion
23d front end opening
23e front end ring portion
23f connecting portion
23g rotary drive mechanism
23h rear end ring portion
23 drum portion
24 partition plate
30 casing
30a supply port
30b exhaust port
30c gap portion
30d inner surface
40 spray apparatus 100 rotary drum type fluidizing apparatus
A particulate carriers
C catalyst solution
G drying gas
H inflow direction
I disposing direction
S surface
X central axis
e angle

The invention claimed is:

1. A method of producing catalyst supports for use in producing fibrous carbon nanostructures, the catalyst supports comprising:

carriers and a catalyst layer formed on the carriers, wherein the catalyst layer comprises a metal-containing compound, and wherein the method comprises a step of adjusting a difference $\Delta YI$ in yellowness expressed by the formula $\Delta YI = YI_B - YI_A$ to be 3 or more and 20 or less, where $YI_A$ is a yellowness of the carriers, and $YI_B$ is a yellowness of the catalyst supports.

2. The method of producing catalyst supports according to claim 1, wherein the metal-containing compound comprises an iron compound.

3. The method of producing catalyst supports according to claim 2, wherein the iron compound comprises an iron oxide.

4. The method of producing catalyst supports according to claim 1, wherein the carriers have a surface covered with a catalyst supporting layer.

5. The method of producing catalyst supports according to claim 4, wherein the catalyst supporting layer comprises a ceramic material.

6. The method of producing catalyst supports according to claim 5, wherein the ceramic material comprises an aluminum oxide.

7. A method of producing fibrous carbon nanostructures, comprising a step of supplying a source gas to the catalyst supports produced by the method of producing catalyst supports according to claim 1 to synthesize fibrous carbon nanostructures on the catalyst layer.

*   *   *   *   *